A. O. VAN DERVORT.
BELL RINGER.
APPLICATION FILED JAN. 28, 1909.
926,444.
Patented June 29, 1909.
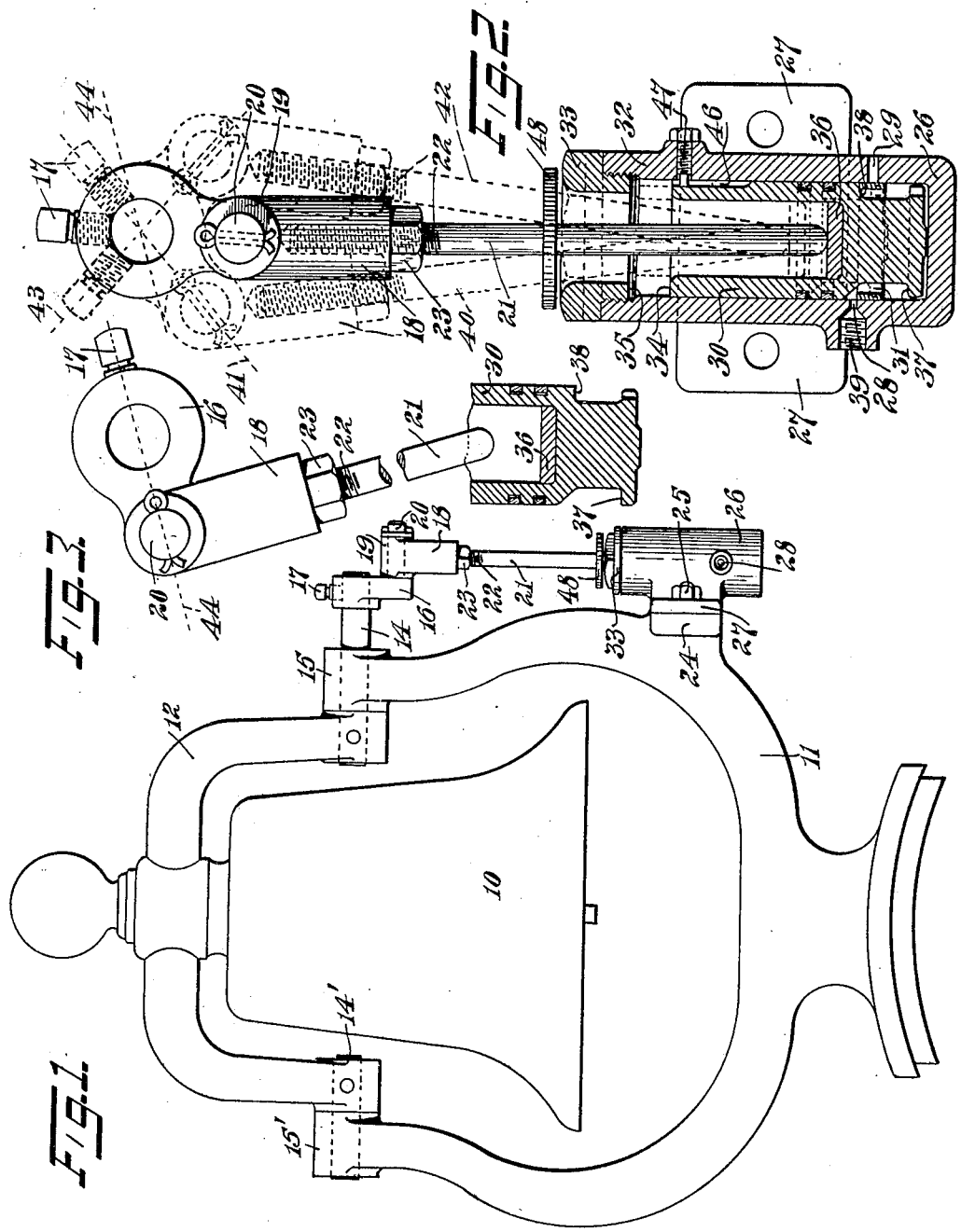
Witnesses:
Inventor:
Adrian O. VanDervort,
By his Attorney,

UNITED STATES PATENT OFFICE.

ADRIAN O. VAN DERVORT, OF TROY, NEW YORK.

BELL-RINGER.

No. 926,444.  Specification of Letters Patent.  Patented June 29, 1909.

Application filed January 28, 1909. Serial No. 474,779.

*To all whom it may concern:*

Be it known that I, ADRIAN O. VAN DERVORT, a citizen of the United States, residing in Troy, in the county of Rensselaer and State of New York, have invented certain new and useful Improvements in Bell-Ringers, of which the following is a specification.

This invention relates to and has for an object to provide improved bell ringing mechanism and particularly such as is operative by means of some expansive fluid.

Among the objects of the invention is to provide such a suitable connection between a swinging bell and a piston that the piston will have the limit of its forward movement fixed, and will positively move the bell a fixed distance, after which the momentum of the bell will carry it forward a certain distance during which time it will be free of the piston. Upon the bell returning to its initial position, it will return the piston to its initial position and continuing its swinging movement will start upon an excursion in the opposite direction prior to the next forward movement of the piston, so that the bell will automatically swing in opposite directions alternately incident to repeated and similar piston strokes.

Means is provided for regulating the force applied to the piston rod so that the piston having a fixed limit for its forward movement can have its applied force regulatable by the adjustment of its starting point. In the illustration, the piston upon its forward movement will actuate a valve for cutting off the supply and for opening the exhaust, and will upon its return movement actuate the valve for cutting off the exhaust and opening the supply. One means for varying the working force of the piston is by regulating the amplitude of its backward stroke or recessional excursion, which is the supply port opening stroke.

In the drawings accompanying and forming a part of this specification, Figure 1 is an elevation of a locomotive bell together with its bell frame to which is applied a practicable embodiment of a form of my invention. Fig. 2 is an enlarged view partly elevational and partly sectional of the bell ringer illustrated in Fig. 1 looking at this from the right hand side; this view showing some of the parts in various dotted line positions; and Fig. 3 is a detail showing the free forward movement of the piston rod incident to the momentum of the bell after the piston has been halted in its forward movement.

In the present illustration, the invention is shown applied to a locomotive bell designated herein by the reference character 10, which bell is supported by a bell frame 11, the bell being fastened upon a yoke 12 which is provided with trunnions 14, 14' supported in bearings 15, 15' of the frame 11. One of the trunnions 14 is shown extending beyond its bearing and carrying a crank 16 which may be adjustable upon the trunnion, in the present instance there being shown a set screw 17 for permitting such adjustment and for holding the crank in its position of adjustment. An internal screw threaded sleeve 18 is shown as having a bearing portion 19 surrounding the wrist pin 20 of the crank 16.

Mounted within the sleeve 18 is a connecting-rod 21 which has a screw-threaded portion 22 whereby the length of the connecting-rod may be adjusted, the rod will be secured in its adjusted position by means of the set nut 23. The frame 11 is shown as carrying a bracket as it were 24 to which is removably secured, as by means of tap bolts 25 a cylinder 26, the cylinder having wings 27 for receiving the said tap bolts whereby the wings will be drawn securely against the bracket 24. The cylinder 26 is shown as provided with admission and exhaust ports at its bottom, which bottom is shown as being closed. The admission port 28 is at a little distance above the exhaust port 29.

Some suitable form of expansive fluid will be employed for actuating the piston 30 which is located within the cylinder. It has been found in practice that compressed air is a convenient fluid to employ.

The valve for the ports comprises in the present instance a ring 31 which will fit the inside of the cylinder sufficiently tightly that it will remain in whatever position it is placed until it is moved into some other position, and it is of sufficient dimension longitudinally of the cylinder that it will when closing one or the other of the ports 28—29 open the other. The upper end 32 of the cylinder is screw-threaded and a bushing 33 has screw-threaded engagement therewith. This bushing 33 is for adjustably limiting the forward or working stroke of the piston, the upper end 34 of which will engage the lower end 35 of the bushing which will bring the piston to a stop. The position at which the piston will be halted may be adjusted by the adjustment of the bushing 33 and thereby the position of the face 35.

Assuming the parts to be in the position illustrated in Fig. 2, upon the entrance of the fluid, as for instance compressed air, through the admission port 28, the piston will be caused to advance until the faces 34 and 35 come into engagement. The connecting rod 21 has its free end dependent within the piston and as the piston rises either it or a suitable wear resisting plate 36 will engage the end of the connecting rod and force this up and in this means rotate the trunnion 14 and swing the bell. Sufficient momentum will be given to the bell by the amount of swinging which is imparted to it during the stroke of the piston that it will continue its swinging motion for a certain distance. After the piston has advanced a certain amount a shoulder 37 will engage the lower side of the ring valve 31 and raise this. The parts are so adjusted that when the faces 34, 35, come together the admission port 28 will be closed by the ring valve and the exhaust port 29 be open. After the bell has come to a stop in its outward swing it will swing back again toward the normal position and carry the connecting-rod 21 again into engagement with the piston or the plate 36 and force the piston back again to its normal or initial position. During this return movement of the piston a shoulder 38 thereon will engage the upper face or edge of the ring valve 31 and return this so that it will close the exhaust port 29 and open the admission port 28. The bell will not stop when it comes to its normal idle position but will swing farther so that the crank 16 will pass its dead center at about the time fluid will again enter the cylinder and force the piston up and cause the bell to swing outward in the opposite direction from its previous swing. This operation of the bell swinging from side to side will be carried on as long as the admission port is open to the supply of expansive fluid. The wall of the cylinder is shown as provided with a suitable connection 39 for a source of fluid supply.

It is frequently desirable to change the amount of force applied to the bell in ringing it and this may be accomplished by adjusting the length of the connecting rod, thereby regulating the length of piston stroke, for this purpose the connecting-rod is adjustable in the sleeve 18. If the connecting-rod is shortened the piston will be given a correspondingly shorter recession and if lengthened the recession of the piston will be lengthened. Not only will an adjustment of the length of the connecting-rod vary the length of time or duration of time in which the piston is active upon the bell through the connecting-rod, but also the length or duration of time the bell is active upon the piston, but it will also limit, in the recession of the piston the downward movement of the ring valve 31 which limitation of downward movement regulates the amount or extent to which the admission valve 28 is opened, so that when the length of the stroke of the piston is thus regulated the amount of fluid to be admitted is also regulated, as is also the period at which the valve will be engaged by the shoulder 37 for closing the inlet port. In other words when the connecting rod is shortened the stroke of the piston is shortened, the area of the admission port is diminished, and the length of travel of the member which will engage the valve to close it is also shortened.

In Fig. 2 the dotted line position 40 of the connecting rod shows the position of the parts upon the outward swinging of the bell to one side and the reverse movement or swinging to the other side is represented by the dotted line position 42. The lines 41 and 43 intersecting the axes of the trunnion 14 and crank wrist 20 show the movement produced by successive working strokes of the piston in the illustrated adjustment, this being compared with the line 44 will show the relative position of these same axes by the free movement of the bell incident to its momentum derived from the working stroke of the piston. This latter, or free movement is illustrated in Fig. 3. In setting up the device it will of course, be understood that the crank wrist 20 will not normally be in a dead center position.

Some suitable means will be provided for preventing the rotation of the piston within the cylinder, the piston is shown as having a longitudinal groove 46 which will travel upon a set screw 47. This will not only prevent the rotation of the piston relative to the cylinder but will also prevent the displacement of the piston when the bushing 33 is removed.

A cover 48 is placed upon the connecting rod 21 to exclude water, cinders, etc., from the hollow-piston 30.

Having thus described my invention, I claim.

1. The combination with a piston, of a cylinder within which the piston is mounted, a bushing having screw-threaded connection with one end of said cylinder and having a face for limiting the forward movement of the piston, said cylinder being provided with an inlet and an outlet port, the inlet port being located forwardly of the outlet port, a ring mounted in said cylinder and having a close working fit therewith, means upon the piston for advancing the ring upon the working forward stroke of the piston for closing the admission port, said admission port opening means being located and adapted for varying the area of port opening upon variation of amplitude of the recessional excursion of the piston, and opening the exhaust port and means carried by the piston for shifting the ring upon the recessional movement of the piston for opening the admission port and closing the exhaust port, a reciprocatory member having a portion adjustable in the line of its reciprocation for the engagement of the piston, and an oscillatory member connected to said reciprocatory member the connections therebetween being constructed and adapted for moving said reciprocatory member out of engagement with the piston incident to its momentum along its excursion and for moving it into engagement with said piston upon its recession for returning the piston and the ring valve to initial position, the adjustability of the reciprocatory member being effective to vary the length of the recessional stroke of the piston and thereby upon its recession for varying the amplitude of the recessional excursion of the piston.

2. The combination with a piston, of a cylinder within which the piston is mounted, a member carried adjustably by the cylinder and having an abutment face for limiting the forward movement of the piston, said cylinder being provided with an inlet and an outlet port, the inlet port being located forwardly of the outlet port, means controlled by the piston upon the working forward stroke thereof for closing the admission port and opening the exhaust port and upon the recessional movement thereof for opening the admission port and closing the exhaust port, a reciprocatory member having a portion adjustable in the line of its reciprocation for the engagement of the piston, and a member to have an oscillatory movement connected to said reciprocatory member the connections therebetween being constructed and adapted for permitting said oscillatory member by its momentum to move said reciprocatory member out of engagement with the piston and for moving it into engagement with said piston upon its recession for returning the piston to a position predetermined by the adjustment of said portion of the reciprocatory member.

3. The combination with a piston, of a cylinder within which the piston is mounted, means carried by the cylinder for limiting the forward movement of the piston, there being provided an inlet port for the cylinder, a valve for opening and closing the inlet port, means carried by the piston for engaging the valve upon the working forward stroke of the piston for closing the inlet port, and means carried by the piston for engaging the valve and opening the inlet port upon the recessional movement of the piston, a reciprocatory member adjustable in the line of its reciprocation for the engagement of the piston, an oscillatory member connected to said reciprocatory member, and the connections therebetween being constructed and adapted for returning the piston and the valve to initial position upon the recessional movement of said oscillatory member, the adjustability of the reciprocatory member being effective for varying the length of the recessional stroke of the piston and the extent of the opening of the inlet port.

ADRIAN O. VAN DERVORT.

Witnesses:
H. JUDD WARD,
JOHN H. GAETJÉ.